United States Patent [19]

Gericke et al.

[11] 3,868,227

[45] Feb. 25, 1975

[54] AGGLOMERATING FINE ALKALI METAL SILICATE PARTICLES TO FORM HYDRATED, AMORPHOUS, GRANULES

[75] Inventors: Clarence H. Gericke, Wayne; Richard H. Pierce, Broomall, both of Pa.

[73] Assignee: Philadelphia Quartz Company, Philadelphia, Pa.

[22] Filed: Apr. 5, 1972

[21] Appl. No.: 241,393

[52] U.S. Cl.................... 23/313, 264/117, 423/332
[51] Int. Cl. .......................... B01j 2/00, C01b 33/32
[58] Field of Search ...... 23/302, 300, 313; 264/117; 252/135; 423/332

[56] References Cited
UNITED STATES PATENTS

| | | | |
|---|---|---|---|
| 2,860,033 | 11/1958 | Mockrin | 23/313 |
| 2,860,034 | 11/1958 | Mockrin | 23/313 |
| 3,208,822 | 9/1965 | Baker | 23/312 R |
| 3,340,018 | 9/1967 | Otrholek | 23/313 |
| 3,471,253 | 10/1969 | Shaver | 23/313 AS |
| 3,532,473 | 10/1970 | Biegler | 23/313 |
| 3,687,640 | 8/1972 | Sams | 23/313 AS |

*Primary Examiner*—Wilbur L. Bascomb, Jr.
*Assistant Examiner*—S. J. Emery
*Attorney, Agent, or Firm*—Fred C. Philpitt; Ernest G. Posner

[57] ABSTRACT

Readily soluble agglomerates of hydrated amorphous alkali metal silicates with widely varying but controlled bulk densities can be prepared by a 2-stage process involving agglomeration and drying. Specifically, the process comprises mixing alkali metal silicate solids and solutions in controlled amounts and under controlled conditions so that agglomerates are formed. These agglomerates are dried under certain conditions to produce products with desired particle properties.

10 Claims, No Drawings

AGGLOMERATING FINE ALKALI METAL SILICATE PARTICLES TO FORM HYDRATED, AMORPHOUS, GRANULES

INTRODUCTION

Hydrated amorphous alkali metal silicate powders are generally prepared by spray drying. Such materials are of small particle size and therefore are not suitable for some applications, particularly where physical blending is involved. If the preparation of larger particles is attempted by spray drying the particles are apt to be hollow microballoons of very low bulk density and a fragility that renders them unsuitable for such blending applications. It has been suggested that spray dried materials be agglomerated by heating, while tumbling to provide particles of larger size and bulk density that are suitable for such blending applications; however, the bulk densities of such materials are hard to control and the yield of usable product is highly variable. Also the total feed stock for the process is produced by spray drying which requires high capital expenditures to produce the needed raw materials. A method has been developed to produce hydrated amorphous alkali metal silicate granules with a large particle size and of controlled but widely varying bulk densities. The process comprises preparation of a mixture of fine hydrated alkali metal silicate particles with alkali metal silicate solutions to produce agglomerates which are subsequently dried. More specifically the process involves intimate and energetic mixing of fine alkali metal silicate particles, which may be recycled material from the process or particles dried in a number of ways including spray drying, with solutions of alkali metal silicate. The fine particles and/or the solutions may be at elevated temperatures and the mixtures are heated during mixing so that the solution partially dehydrates. As the silicate solution and fine particles are mixed, loose agglomerates are formed which break down under the mechanical action of the mixer, then as the mixture loses water dense granules with survival strength are formed. These granules are then dried at controlled temperatures for controlled times to produce products of controlled bulk densities. The process may also be carried out by mixing fine alkali metal silicate particles with water until agglomerates are formed.

THE INVENTION

The solutions to be used as the agglomerating liquid in this invention can be of any alkali metal silicate with a mole ratio of $SiO_2/M_2O$ of 1.2/1.0 to 4.0/1.0 in which M stands for an alkali metal or combination of alkali metals. Most commonly, sodium or potassium silicate solutions can be used, but combinations of sodium and potassium silicate solutions can also be used if desired. Examples of useful silicates are:

| Silicate | Ratio $SiO_2/M_2O$ Wt. % Ratio | Mole Ratio |
|---|---|---|
| B-W Sodium Silicate | 1.6 | 1.65 |
| D Sodium Silicate | 2.0 | 2.06 |
| RU Sodium Silicate | 2.4 | 2.47 |
| K Sodium Silicate | 2.9 | 2.97 |
| N Sodium Silicate | 3.2 | 3.30 |
| S 35 Sodium Silicate | 3.8 | 3.92 |
| Kasil No. 6 Potassium Silicate | 2.1 | 3.29 |
| Kasil No. 1 Potassium Silicate | 2.5 | 3.92 |

B-W, D, RU, K, N, S 35 and Kasil are registered trademarks of the Philadelphia Quartz Company. Water can also be used as the agglomerating liquid in this invention.

The fine particles with which the silicate solution or water is mixed may be obtained by spray drying, fluid bed drying, thin-film drying or double drum drying of sodium and/or potassium silicate solutions. The fine particles may also be the recycled fines and crushed oversize portion of the apparently dry product of the process of this invention. The particle size of this powder can vary but it is preferred that at least 80% of the material pass through 100 mesh screening (Tyler series screens). The moisture content of the powder can be between 8 and 30% when added to the mixer. The $SiO_2/M_2O$ mole ratio can be between 1.2/1.0 and 4.0/1.0 and sodium and/or potassium silicate particles can be used.

The mixing operation, combining the fine particles and the solution, is a critical part of this process. When this operation is completely under control it is relatively simple to produce agglomerated particles with bulk densities between 25 and 55 lbs/cu.ft. Energetic mixing requires that the mixer must be capable of mixing the 2 components intimately and must be sufficiently powerful to break up a viscous mass. The mixtures of fine silicate particles and silicate solutions are prepared so that the solution constitutes up to 50% of the mixture. Excellent results are obtained when between 5 and 33% of the mixture is comprised of silicate solution. The moisture content of these mixtures as initially prepared can vary between 23 and 33% whether silicate solution or water is used as the agglomerating liquid. These mixtures may set up to plastic masses if the mixer is not capable of powerful and intimate mixing action. The moisture content of the mixture must be reduced so that the material is in a flowable condition i.e. the mixture flows or has become granular on entering the dryer. In order to reduce the moisture content of the mixture it is beneficial to heat the fines and the solution before mixing. The material should be as hot as practical, usually below 230°F but above 120°F. The mixer may also be jacketed to provide additional heat during mixing. The mixture is maintained at 120° to 230°F during mixing. The residence time of the material in the mixer may be up to 2 hours during which time the moisture content of the mixture is reduced from about 23 to 33%, to between 20 and 27% before the material enters the dryer.

As the mixture of fines and solution is prepared, loose agglomerates are formed. These may be broken down by the mechanical action of the stirrer. These loose agglomerates may reform and be broken down several times, but as the mixture dehydrates globular granules with survival strength are formed and the mixture flows, that is separate granules may be poured as from a bucket.

The flowable, partially dried material from the mixing step is fed into a rotary dryer. The dryer used is a horizontal drum fitted with dams and lifts, so that when the drum is rotated the particles are tumbled, cascaded and/or rolled one upon the other. The combination of the rotation, interior design and the pitch of the dryer determine the retention time of the particle in the dryer. The particles in the dryer can be heated indirectly through the dryer walls and any means of heating may be applied but the primary and preferred means of heating is an air stream directed through the dryer. The inlet temperature for this air stream can be between 240° and 580°F while the outlet temperature can be between 130° and 300°F.

The product discharged from the dryer comprises 35 to 75% in the 14 to 65 mesh size with 0 to 7% smaller than 65 mesh and 40 to 65% larger than 14 mesh. All of the material in the 14 to 65 mesh size range may be retained as product while the oversized material can be crushed and combined with the fines to provide the fine particles needed in the process. The untamped bulk density can be between 15 and 55 lbs/cu.ft. with the moisture content between 15 and 30%, generally between 18 and 25%.

The properties of the product depend on the properties of the feed stock, especially the particles used, the proportions of particles and solution used and the process conditions, especially the temperature and duration of the drying step. In one embodiment of this invention spray dried sodium silicate particles with a fine particle size and a bulk density of, for example, about 30 lbs/cu.ft. are mixed with, for example, 5 to 10% sodium silicate solution to produce agglomerates which are somewhat more dense and are dried with sufficient heat to cause expansion of the particles so that the resulting product has a tamped bulk density of, for example, about 25 lbs/cu.ft. Spray dried sodium silicate particles can be used with more silicate solution to produce products with other bulk densities on drying. In another embodiment of the invention the recycled fines and crushed oversize from the process itself were mixed with, for example, 5 to 10% silicate solution to form granules of, for example, above 30 lbs/cu.ft. These particles when dried with sufficient heat had a bulk density of about 25 lbs/cu.ft. The recycled material can also be mixed with high percentages of solution to make more varied products.

The bulk density of the product is strongly influenced by the heat to which the agglomerates are subjected during the drying step and the water content of the agglomerates fed to the dryer. If the agglomerates are high in water content and are subjected to high temperature for short times, the products are expanded and have a low bulk density. If the agglomerates are subjected to a lower temperature for a longer period the bulk density is higher.

This product is useful in detergent mixtures where it can be blended with other granular materials and, optionally, smaller amounts of liquid ingredients to furnish non-caking detergent formulations. These hydrated silicate products are also useful in detergent formulations containing minimal water to be subsequently spray dried, and in such diverse applications as water treatment, corrosion prevention, brick manufacture, clay refining or ceramic and refractory binders, where the use of a readily soluble silicate is desirable but the convenience of a granular powder rather than liquid form is advantageous, or as a binder or adhesive hot-melt where liquification or reactivity is facilitated by moisture but the subsequent disposal of moisture causes problems.

EXAMPLES

A further understanding of the invention can be obtained from the following examples that illustrate certain embodiments of the invention and should not be considered restrictive. The $SiO_2/M_2O$ ratios are on a mole basis while all other proportions are in parts by weight, pbw. The mesh sizes are based on Tyler series screens.

EXAMPLE 1

A total of 40 pbw of hydrated sodium silicate particles were charged into an energetic mixer (Marion Mixer, Rapids Machine Co., Marion, Iowa, Model 1002) and sprayed with 12 pbw of sodium silicate solution. The silicate particles had a 2.06 $SiO_2$/1.00 $Na_2O$ ratio, 20% moisture and a particle size such that 80% of the material passed through 100 mesh screening. The silicate solution also had a 2.06 $SiO_2$/1.00 $Na_2O$ ratio and contained 44.1% solids. Both the powder and solution had been heated to 150°F before mixing. The mixture as prepared contained 28.3% moisture. The jacketed mixer was heated with steam and the mixer kept in operation until the mix had lost moisture to 25.0% and was in a flowable condition. This mixture was processed through a rotary dryer (Ruggles-Coles Rotary Dryer, Harding Div. of Kopper Co., York, Pa., Class XF-XH, No. 666-5) at various conditions. The conditions under which the material was dried and the results are summarized in the following table. This shows the change in bulk density with a change in the temperatures in the dryer.

| Sample No. | Dryer Temperature (°F) Inlet | Dryer Temperature (°F) Outlet | Ignition Loss (%) | Bulk Density(Lbs/cu.ft.) Untamped | Bulk Density(Lbs/cu.ft.) Tamped |
|---|---|---|---|---|---|
| 1 | 240 | 130 | 23 | 53 | 58 |
| 2 | 300 | 170 | 22 | 52 | 59 |
| 3 | 300 | 180 | 21 | 47 | 54 |
| 4 | 360 | 200 | 19 | 43 | 50 |
| 5 | 400 | 220 | 19 | 42 | 48 |
| 6 | 450 | 250 | 18 | 22 | 28 |

These materials were free-flowing white powders that did not cake under moderate pressure. They were very soluble with less than 0.1% undissolved when 5g of granules were dissolved in 95g of water at 190°F for 5 minutes.

EXAMPLE 2

A product of high bulk density was prepared using the starting materials of Example 1. The mixture prepared had 30.2% moisture and consisted of 30 pbw of silicate particles and 12 pbw of silicate solution. The moisture content of the mixture was reduced in the steam jacketed Marion mixer to 23.0% before the material was charged to the Ruggles-Coles rotary dryer. The inlet temperature of the dryer was controlled between 460° and 480°F with the outlet temperature between 230° and 25°F. The product was screened and found to consist of 52% larger than 14 mesh, 2% smaller than 65 mesh and 46% in the 14 to 65 mesh size range. The 14 to 65 mesh material was bagged as the product and had a bulk density of 49 lbs/cu.ft. untamped and 56 lbs/cu.ft. tamped. (This example illustrates that the bulk density depends not only on the dryer temperature but on the water content of the material fed into the dryer.) The ignition loss was 18.9% and the granules dissolved quickly and completely with an undissolved value of only 0.01% under the test conditions of Example 1.

EXAMPLE 3

A product of intermediate bulk density was prepared using the starting materials of Example 1. The mixture prepared had a 29.7% moisture content and consisted of 50 pbw of the silicate particles and 12 pbw of the silicate solution. The moisture content of the mixture was reduced in the steam jacketed mixer until it became free-flowing (23% $H_2O$), then the material was charged to the rotary dryer. The inlet temperature of the dryer was controlled at 580°F and the outlet temperature was between 280° and 300°F. The product in the 14 to 100 mesh size range had bulk densities of 31 lbs/cu.ft. untamped and 38 lbs/cu.ft. tamped. The ignition loss was 16.5% and the granules dissolved quickly and completely under the conditions of Example 1 with only 0.01% undissolved. The product was a free-flowing white granular powder which did not cake under moderate pressure.

EXAMPLE 4

A continuous process was set up to produce high bulk density sodium silicate granules. The mixture prepared had a moisture content of 28.8% and consisted of 37.7 pbw of silicate particles (ground recycle from the process with the same specifications as Example 1) and 12.4 pbw of the silicate solution of Example 1. The moisture content of the mixture was reduced in the steam jacketed Marion mixer to 23.0% and the mixture became flowable before the material was charged to the Ruggles-Coles rotary dryer. The inlet temperature of the dryer was controlled between 460° and 480°F with the outlet temperature between 230° and 250°F. The product was discharged from the dryer and 6.7 pbw of the 10 to 65 mesh fraction or about 18% was retained as product. The bulk density of the product was 48 lbs/cu.ft. untamped and 57 lbs/cu.ft. tamped. The ignition loss was 20.2% and the granules dissolved quickly and completely with an undissolved value of 0.03% under the test conditions of Example 1. The remainder of the material discharged from the dryer (31.0 pbw) was ground so that 80% of the material passed through 100 mesh screening and then recycled to form the particles needed for the process.

EXAMPLE 5

Sodium silicate granules were prepared using the method of Example 4. The mixture prepared had a moisture content of 28% and consisted of 45.0 pbw of silicate particles (ground recycle from the process with 2.47 $SiO_2/1.0$ $Na_2O$, 18% moisture and a particle size such that 80% of the material passes 100 mesh) and 18.0 pbw of sodium silicate solution with a 2.47 $SiO_2/Na_2O$ ratio and 47% solids. The moisture content was reduced in the steam jacketed Marion mixer to 24.5% before the flowable material was charged to the Ruggles-Coles rotary dryer. The inlet temperature was controlled at 450°F while the outlet temperature was 280° to 300°F. The product was discharged from the dryer and 10.3 pbw of the 14 to 65 mesh fraction was retained as product. The bulk density of the product was 21 lbs/cu.ft. untamped and 28 lbs/cu.ft. tamped. The ignition loss was 17.9% and the granules dissolved quickly and completely under the test conditions of Example 1 with only 0.08% undissolved. The remainder of the material discharged from the dryer (35.1 pbw) was ground so that 80% passed through 100 mesh screening and was recycled.

EXAMPLE 6

Spray dried sodium silicate particles with a bulk density of 31.2 lbs/cu.ft. and 18% moisture were mixed with the sodium silicate solution of Example 1 in such proportions that the silicate solution constituted 8% of the total mixture. The components had been heated to 140°F before mixing in the Marion mixer. After the agglomerates had formed and the mixture formed a flowable material it was charged to the Ruggles-Coles rotary dryer. The inlet temperature was 580°F and the outlet temperature varied between 280° and 300°F. The product had an untamped bulk density of 20 lbs/cu.ft. and a tamped density of 25 lbs/cu.ft. The ignition loss was 17.3% and the granules dissolved quickly under the test conditions of Example 1 with 0.10% undissolved.

EXAMPLE 7

A mixture of spray dried sodium silicate and sodium silicate was prepared and consisted of 40.0 pbw of particles with 2.03 $SiO_2/1.0$ $Na_2O$, 18.7% $H_2O$ and a particle size less than 100 mesh, and 17 pbw of sodium silicate solution 2.02 $SiO_2/1.0$ $Na_2O$ and 50% solids. The moisture content was reduced to 26.2% in the mixer. The flowable agglomerates were charged to the rotary dryer with the inlet temperature at 460° to 480°F and the outlet temperature between 230° and 250°F. The product discharged from the dryer consisted of 60% in the 14 to 65 mesh size range and had a tamped bulk density of 43 lbs/cu.ft. The granules dissolved rapidly with less than 0.09% undissolved under the test conditions of Example 1.

EXAMPLE 8

A dry blended home laundry detergent of the following composition was prepared using the 25 lbs/cu.ft. product of Example 6.

| | |
|---|---|
| Triton X-100 (nonionic surfactant; Rohm % Haas Corp) | 120.0 pbw |
| Sodium Nitrilotriacetic Acid Monohydrate (Organic sequestering agent) | 30.0 |
| Hydrated Granular Sodium Silicate of Example 4 (2.06 $SiO_2/Na_2O$, 20.2% $H_2O$) | 36.0 |
| $Na_2CO_3$ | 21.0 |
| Sodium Carboxymethyl Cellulose (anti-redeposition agent) | 1.0 |
| Blancophor CM (Optical brightener; GAF Corp) | 0.2 |
| Water | 7.0 |

The mixture was blended easily and none of the ingredients segregated from the mix. The mixture was an effective home laundry detergent compound that was non-corrosive to metal washing machines parts.

EXAMPLE 9

The hydrated sodium silicate particles of Example 1 were sprayed with sufficient water to raise the moisture content to 28%. The jacketed mixture was heated to 135°F and kept in operation until the mix had lost moisture to 25.3% and was in a granular condition. This material was fed to the rotary dryer with the inlet temperature at 460°F and the outlet temperature at 250°F. The tamped bulk density of the 14 to 65 mesh fraction was 27 lbs/cu.ft. and the free-flowing white powder dissolved with less than 0.1% under the test conditions of Example 1. The ignition loss was 17.8%.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What we claim is:

1. A process for preparing hydrated, amorphous, granular alkali metal silicates having an $SiO_2/M_2O$ mole ratio of 1.2/1.0 to 4.0/1.0 comprising:
   a. mixing fine, amorphous alkali metal silicate particles selected from the group consisting of sodium silicate, potassium silicate and sodium-potassium silicate and an agglomerating liquid which is an alkali metal silicate solution selected from the group consisting sodium silicate, potassium silicate and sodium-potassium silicate, said mixture containing between 23 and 33% moisture;
   b. energetically mixing and heating the mixture to temperatures between 120° and 230°F. until it granulates, becomes flowable and the moisture content is between 20 and 27;
   c. charging the granulated mixture to a rotary dryer; and
   d. conducting air through the dryer with an inlet temperature of above 240°F and an outlet temperature above 130°F to dry the agglomerated material to form a hydrated, amorphous, granular alkali metal silicate product having a moisture content between 15 and 25%.

2. The process of claim 1 carried out in a continuous manner in which the dry agglomerated product solids removed from the process is limited to the portion of the solids added as a solution and the remaining granular material is recycled to form the particle portion of the mixture.

3. The process of claim 1 in which the hydrated alkali metal silicate feed particles contain 5 to 30% moisture.

4. The process of claim 1 in which the agglomerating liquid is alkali metal silicate solution and comprises up to 50% of the mixture.

5. The process of claim 1 in which the alkali metal silicate particles are obtained from a process from the group consisting of:
   a. spray drying;
   b. thin film drying;
   c. fluid bed drying; and
   d. double drum drying.

6. The process of claim 5 in which at least 60% of the dryer output is retained as product.

7. The process of claim 1 in which the fine particles of alkali metal silicate are obtained by spray drying and have a bulk density of above about 30 lbs/cu.ft.

8. The process of claim 1 in which the alkali metal silicate particles are recycled fines and crushed oversize granules from the process of claim 1.

9. The process of claim 1 part (a) in which the alkali metal silicate particles and/or the alkali metal solution are heated to between 120° and 230°F prior to mixing.

10. The process of claim 1 in which water is the agglomerating liquid mixed with the alkali metal silicate particles.

* * * * *